Feb. 14, 1950   J. C. RICHARDSON   2,497,273
PIPE CONNECTION
Filed Aug. 21, 1946   3 Sheets-Sheet 3
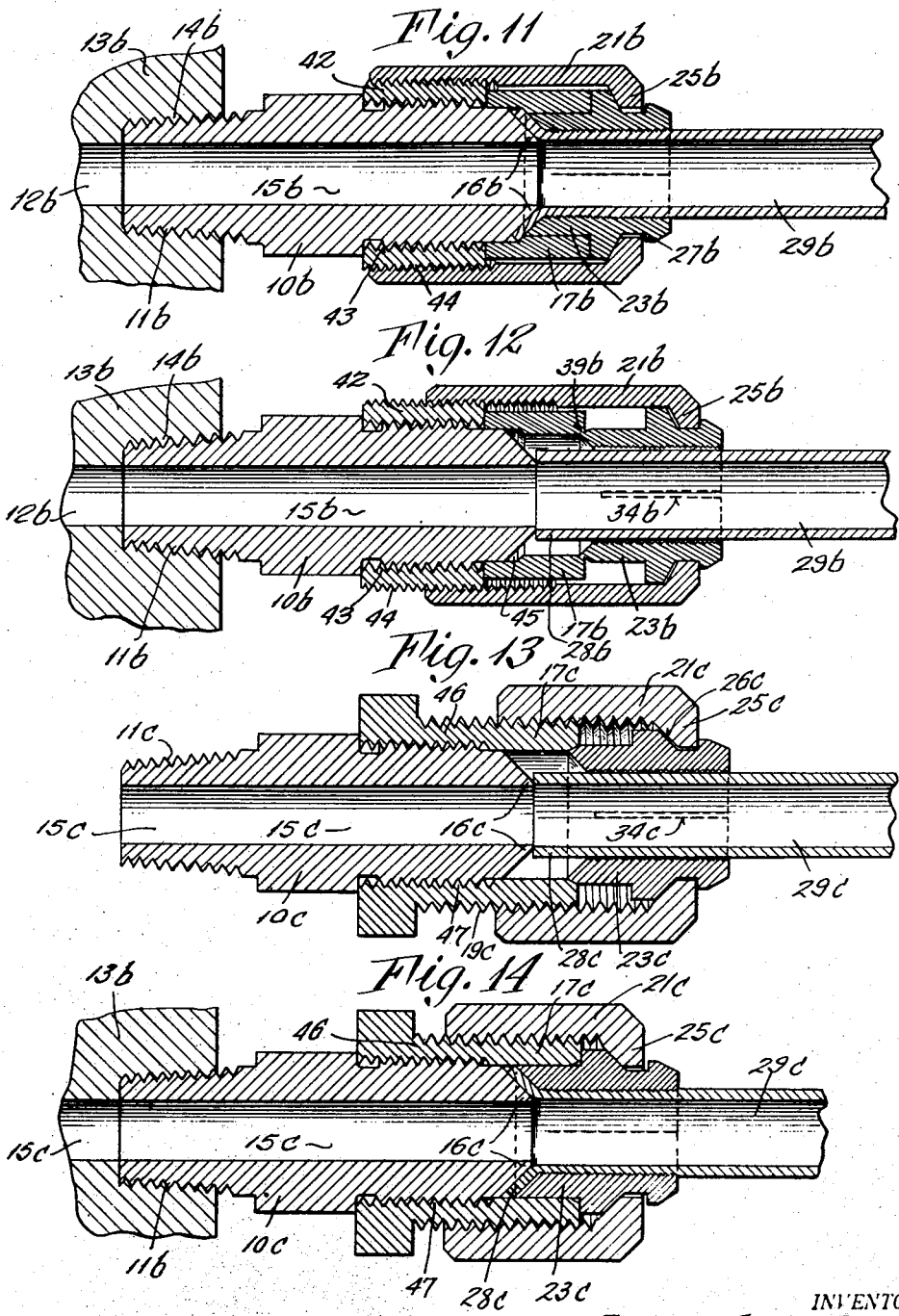
INVENTOR.
James C. Richardson
BY
Johnson, Kline and Hensel
ATTORNEYS Patented Feb. 14, 1950

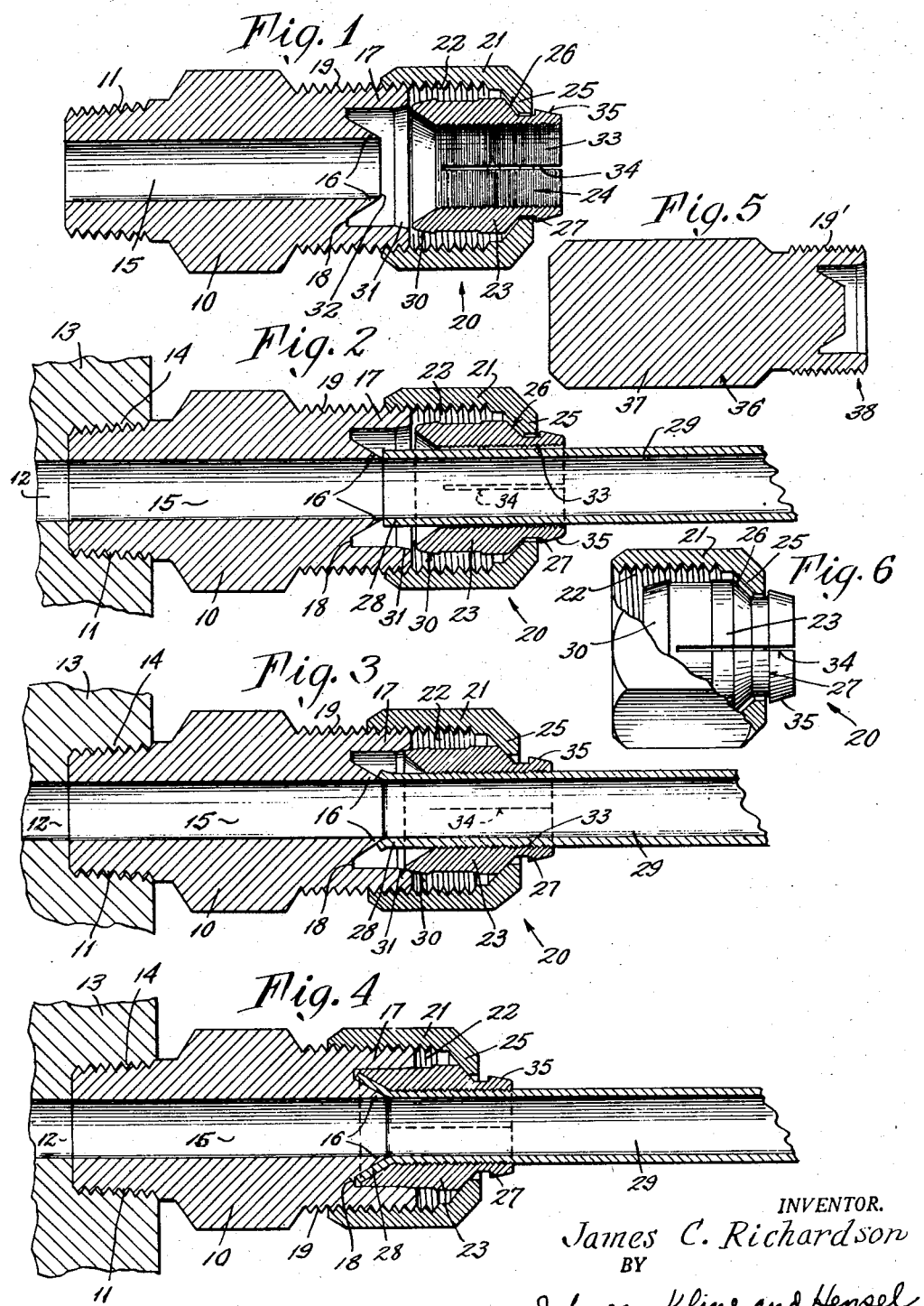

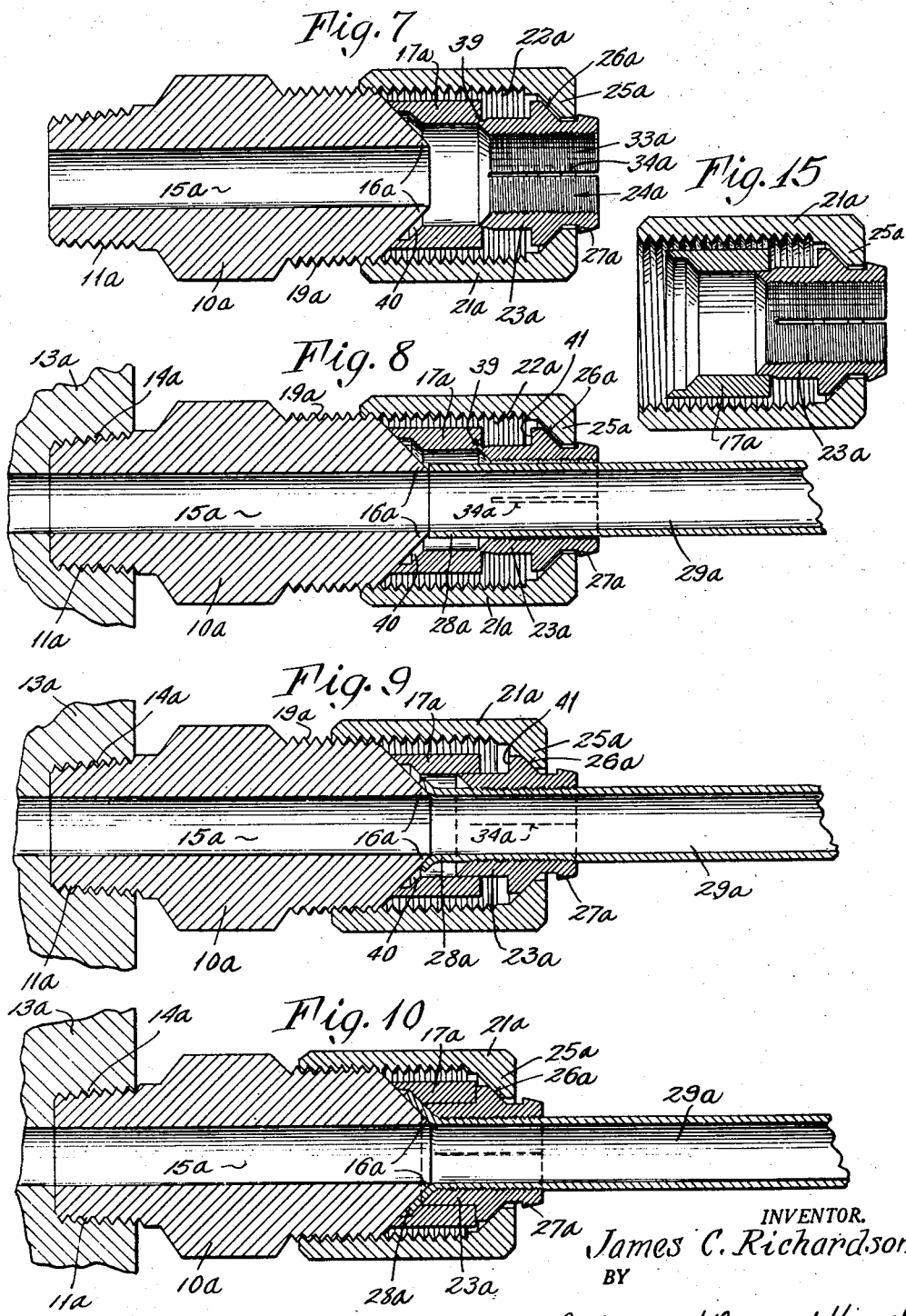

2,497,273

UNITED STATES PATENT OFFICE 2,497,273

PIPE CONNECTION

James C. Richardson, Utica, N. Y., assignor to The Brockway Company, Naugatuck, Conn., a corporation of Connecticut Application August 21, 1946, Serial No. 691,914

5 Claims. (Cl. 285—86)

This invention relates to connectors for ductile pipes, tubes, and other conduits, and more particularly to the type adapted to flare and clamp the pipe etc., during the operation of making up the connection.

The need for convenient and satisfactory means for connecting bendable pipes, such as tubing of copper, lead, tin, iron and alloys of these and other metals, plastics and rubber, to various fittings and orifices of engines, machines and apparatus has been of long standing and many proposals have been made in an attempt to satisfy the need. The most satisfactory type of connection heretofore proposed is that in which the pipe is gripped by the connector and then advanced toward the conical end of a fitting by a draft member, such as a nut, whereby the end of the pipe is flared by being expanded over the conical end of the fitting and is then clamped against the latter.

The difficulty with this prior proposal is that a great deal of time and effort is required to make the connection. For instance, before the connection can be made, the nut must be slipped over the end of the pipe, being first removed from the fitting if previously attached. Then a sleeve, which nests in the hollow interior of the nut, must be slipped over the pipe, and then a split resilient bushing or ferrule must be sprung apart and slipped over the end of the pipe and positioned thereon quite accurately a predetermined distance from the end of the pipe where it firmly grips the pipe. Then the nut with the sleeve is slid over the ferrule and the whole is moved toward the fitting and the nut screwed over the threaded end of the fitting.

This use of time and effort is completely eliminated by the present invention by making it possible to insert the end of the pipe as far as it will go into the connector while it is attached to the fitting, and then merely turn the nut to tighten it down on the fitting. Thus, for the first time, it becomes possible to attach the assembled fittings and connectors to the engine, machine, or other apparatus during the construction thereof, and then, after cutting the pipes and bending them to desired shapes, merely inserting the ends of the pipes in the various connectors and tightening the nuts.

This is accomplished, according to the present invention, by providing within the nut, and preferably but not necessarily permanently assembling therewith, a ferrule whose bore is such that the pipe may be passed through the ferrule with no obstructing resistance therefrom while the nut is attached to the fitting and which has a cam surface cooperating with a cam surface on another member (the end of the fitting, for instance) whereby, when the pipe is in position with its end engaging the flare-forming end of the fitting and the nut is tightened, the ferrule first becomes clamped on the pipe and then advances it toward the fitting causing the end of the pipe to flare over the fitting and finally clamp the flared end of the pipe between the end of the fitting and a correspondingly recessed seat on the end of the ferrule to produce a leakproof solderless joint between the pipe and the fitting.

In the form of the invention at present preferred for new installations, the member having the cam cooperating with the cam on the ferrule proper is formed integral with the fitting as a projection surrounding the flare-forming end of the fitting. However, when the connection is to be made to an ordinary fitting previously installed and used heretofore with preflared pipe or with the fitting referred to above, the cooperating cam member may be in the form of a separate sleeve pressed into the ferrule to be a unit therewith and adapted to abut the end of the fitting to be held stationary thereby while the ferrule advances with the nut; or the cooperating cam member may be formed on the sleeve initially integral with the ferrule but connected to it by a frangible section which is broken down during the first part of the movement of the nut when the sleeve abuts against the fitting and then stops while the ferrule proper continues to advance into it.

In another form of the present invention, the ordinary fitting may be provided with a cavity-forming cam sleeve by applying to the fitting on the nut a bushing having a projecting sleeve.

In some instances, it may be preferable, when connecting pipes to preexisting standard fittings, to use the nut and ferrule of this invention along with a suitable flaring tool. Such a tool may be like the fitting and contain the cam member and threads whereby the nut with its ferrule and pipe may be advanced to flare the pipe within the tool after which the tool may be removed and the connector with the flared pipe may be applied to the fitting.

Another difficulty which has been encountered in prior connectors of the type referred to above has been that excessive torque applied to the nut after the flared end of the pipe was clamped has caused the flared end to be fractured or sheared off due to the fact that the flared end of the pipe is compressed so thin that it does not have sufficient strength to resist excessive pressure.

This is avoided by the present invention by so constructing the connector that after the end of the pipe has been flared to the proper extent, further flowing of the material of the flared portion is prevented because the space which the flared end of the pipe occupies is limited on all sides and the material cannot thin out and become weakened, or extended beyond the elastic limit.

Another difficulty with the prior connectors of the type above referred to is that during the making up of the connection the pipe rotates relative to the fitting while the nut is being drawn up. If the other end of the pipe is anchored and the rotation is excessive, it tends to twist and kink the pipe. If the rotation of the pipe is excessive or slight, it is still troublesome because, in sliding over the conical projection of the fitting, part of the material of the pipe is scuffed off forming slivers which ultimately find their way into the interior of the pipe and fitting and may cause a great deal of trouble in the operation of the mechanism to which the fitting is connected.

This is avoided by the present invention by causing the ferrule to be brought into direct or indirect engagement with the fitting immediately upon the pipe being gripped by the ferrule, and such engagement acts as a brake to prevent rotation of the ferrule and consequently of the pipe while the nut is turning, and of course since the pipe does not rotate against the end of the fitting, no scuffing of the material of the pipe takes place. The action of the connector of the present invention may be likened to extrusion rather than that of spinning.

To facilitate the gripping of the pipe by the ferrule, the inside of the ferrule may be roughened as by knurling or fine threading.

Another feature of this invention is the provision of means whereby the ferrule clamps upon the pipe for substantially the full length of the ferrule, thereby providing a firm and solid support for the pipe and avoiding relative transverse movement between the pipe and the ferrule which would tend to loosen the flared end of the pipe from engagement with the fitting.

To accomplish this, the driving connection between the ferrule and the nut is made in the form of a cam so that as the nut is tightened the outer end of the ferrule is pressed in against the pipe. When the material of the ferrule is so stiff that it cannot readily be compressed against the pipe the ferrule may be provided with longitudinal slits to permit it to flex. Preferably, but not essentially, the slits are so dimensioned that when the ferrule is clamped against the pipe the slits are closed against the passage of moisture to the interior of the connector where it may produce trouble such as collapsing the pipe when the moisture freezes.

The splitting of the ferrule also permits for easy assembly of the ferrule and the nut in the manufacture of the connector, for it permits the outer retaining flange of the ferrule to be squeezed together so that the flange may pass under the driving shoulder of the nut to the exterior thereof. Thus the ferrule and nut may be assembled without the use of tools.

A serious difficulty with self-flaring fittings heretofore proposed has been that if the portion of the pipe which is flared is cracked or ruptured, or has a channel or groove, leaks can occur between the flare of the pipe and the flare-engaging portions of the fitting and ferrule, and fluids can escape through the spaces between the ferrule and the nut or through the screw-threads between the nut and the fitting.

According to the present invention, this difficulty is completely obviated in one embodiment of the invention by hermetically sealing and enclosing the flare-forming ends of the fitting and ferrule and the flared end of the pipe. This is accomplished by compressing the ferrule tightly against the exterior of the pipe and forcing the ferrule and pipe into a solid cavity within the fitting. Thus, even if the flared end of the pipe were defective or imperfect, fluids in the pipe cannot escape because the ferrule and fitting solidly cap the end of the pipe forming a seal, i. e. one seal on each side of the flared end of the pipe, another seal between the ferrule and pipe and another seal between the ferrule and the fitting.

By thus crowding the ferrule and the flanged pipe contained therein into the cavity of the fitting, the material of the various parts is virtually kneaded together so as to become virtually one solid piece. This is extremely important in perfecting the seal and also because it eliminates another great difficulty encountered heretofore in the use of flared fittings, namely, that shock vibrations transmitted along the pipe and finally reaching the flared end thereof caused relative movement between the pipe and the fitting and ultimately permitted leaks.

In the use of the form of the present invention in which the ferrule and pipe are crowded into the projecting sleeve on the fitting, shock vibrations cannot act independently on the pipe but are either absorbed by the entire connection and fitting or are transmitted back through the pipe.

The methods herein disclosed of flaring and/or clamping the flared end of the pipe in the fitting may be carried out with the various constructions illustrated and described, or by other specifically different constructions, and such methods constitute part of the present invention.

Other features and advantages will hereinafter appear.

In the accompanying drawings which illustrate several embodiments of this invention Figure 1 is a longitudinal sectional view of a fitting and connector assembled as a unit.

Fig. 2 is a similar view, showing the fitting threaded in a body and the pipe inserted in the connector, with the nut in starting position.

Fig. 3 is a similar view, but showing the nut advanced and the pipe starting to flare.

Fig. 4 is a similar view, showing the nut completely tightened, the pipe flared and clamped by the ferrule.

Fig. 5 is a view partly in section, showing a tool which must be used in place of the fitting body to flare the end of the pipe.

Fig. 6 is a view of the connector and ferrule assembly shown in Fig. 1.

Figs. 7, 8, 9 and 10 are views similar to Figs. 1, 2, 3 and 4, but showing a modified form of connector to be employed with a standard fitting.

Fig. 11 is a view similar to Fig. 4, showing another form of this invention using a standard fitting of the smaller sizes.

Fig. 12 is a view of the modification shown in Fig. 11, but showing the parts in the position they occupy before the fitting is made up.

Fig. 13 is a view similar to Fig. 1, showing another modification which may be used to advantage with fittings for the smaller size pipes, and showing the connector attached to the fitting and the pipe about ready to be flared.

Fig. 14 is a view of the modification of the invention shown in Fig. 13, but showing the pipe flared and clamped.

Fig. 15 is a view of a modified form of the device shown in Fig. 7.

The term "pipe" as used herein is intended to include all sorts of hollow bodies such as are commonly termed pipes, tubes, conduits, etc., and the term "fitting" as used herein is intended to include any separate or separable or integral part of such size and form as is adapted to receive the nut of the connector.

The present invention takes several specifically different forms in its adaptation to various conditions of use.

One of these forms is that illustrated in Figs. 1 to 4 in which the connector and fitting are supplied as a unit for installation, the fitting being especially made to operate with the connector. Another is the form shown in Figs 7 to 10 inclusive, in which the connector is designed to be used with a preexisting or standard fitting. A modification of the second form of the invention is shown in Figs. 13 and 14, including provision of means for adapting the standard fitting for use with the connector shown in Figs. 1 to 4; and a further modification shown in Figs. 11 and 12 provides means for permitting use of the connector shown in Figs. 7 to 10, with standard fittings of the smaller sizes.

In each of these forms of the invention, the advantages of the present invention are obtained in substantially the same way.

Referring to the form of the invention illustrated in Figs. 1 to 4, the connector or coupling comprises a fitting 10 having one end provided with threads 11 or other suitable means whereby the fitting may be secured over or in an orifice 12 of some structure or device 13 as by engagement with threads 14 thereon as illustrated. The fitting has a central bore or hole 15 for communication with a pipe, tube, etc. to be connected to it.

The end of the fitting to be engaged by the pipe is provided with a flare-forming seat 16 which in the device shown is conical, and surrounding the seat is a projecting sleeve 17 whose internal diameter is slightly larger than the base of the cone to provide a circular substantially flat surface 18. The exterior surface of the sleeve 17, and the adjacent surface of the fitting if desired, has threads 19.

The connector or coupling 20 comprises a draft member which may be in the form of a nut 21 having threads 22 to engage the threads 19 on the fitting, and a ferrule 23 located within the nut and having a central bore or hole 24 adapted by size and shape to receive the pipe to be connected.

The ferrule 23 is connected to the nut to be advanced thereby, as the nut is tightened on the fitting, by an inwardly extending flange 25 on the nut engaging a shoulder 26 in the ferrule, and the latter is held assembled in the nut by a flange 27 extending over the flange 25 on the nut.

As will presently appear, the function of the ferrule is to grip the pipe and advance it so that it flares over the flare-forming projection 16, and to finally clamp the flanged end of the pipe to produce a solderless leakproof seal.

According to the present invention, the device may, as a unit shown in Fig. 1, be screwed or otherwise secured to the structure 13, Fig. 2, and then without disassembling the device the pipe to be connected is merely slid through the hole in the ferrule as far as it will go, that is, to the position shown in Fig. 2, wherein the end 28 of the pipe 29 strikes the end of the projection 16.

This is made possible by providing such clearance between the normal inner surface of the ferrule and the exterior of the pipe that the pipe may be slid through the ferrule without obstructing resistance therefrom and by providing for the gripping of the pipe by the ferrule after the pipe is inserted and as the nut is turned to make up the connection.

The parts are so proportioned that when the pipe is inserted in the connector and engages the end of the fitting, the ferrule will be positioned the proper distance from the end of the pipe so as to provide sufficient pipe material ahead of the ferrule to form a full flare when the connection is made up.

Of course, if desired, the nut and ferrule unit may be unscrewed from the fitting and then slipped over the end of the pipe, and then the whole brought to the fitting and the nut started on the fitting, but such procedure is entirely unnecessary, since the pipe may be inserted in the assembled and mounted fitting.

To provide for the ferrule gripping the pipe to advance it for flaring, the external diameter of the ferrule is made slightly larger than the internal diameter of the projection sleeve 17 of the fitting, and cooperating cam surfaces 30 and 31 respectively may be provided on these parts at their meeting edges, so that, as the ferrule is advanced by tightening the nut on the fitting, the material of the leading end of the ferrule will be squeezed down on the pipe, taking up the clearance between the pipe and ferrule, and firmly gripping the pipe. As shown in Fig. 3, the ferrule 23 has entered the sleeve 17 and advanced slightly. This, and the continued advancing movement of the nut and ferrule, causes the end 28 of the pipe to flare, the edge 32 of the flare-forming projection extending into the pipe initially by the slight amount necessary to start the flaring operation.

The interior of the ferrule may be roughened slightly as by knurling or fine threading 33 to insure its gripping a pipe having an oily or slippery external surface, but this roughening will not as a rule be necessary and may be obviated by the slight roughening of the exterior of the pipe if conditions warrant.

The continued advancement of the nut and ferrule forces the end of the pipe over the ferrule until it occupies a position such as illustrated in Fig. 4, where the very end engages the flat surface 18 of the fitting. The parts are so proportioned that by this time the end of the ferrule 23, which is provided with a recess corresponding in angle and shape to that of the projection but not necessarily exactly the same, is in engagement with the flared end 28 of the pipe and clamps the latter securely against the projection.

It is an important advantage of this invention that further tightening of the nut can do no harm to the flared end of the pipe. One reason for this is that when the connection is made up as in Fig. 4, the flared end 28 is in a completely enclosed space and further movement will merely flow the material until the space is completely filled, whereupon all advancing movement of the nut is arrested and continued application of force to the nut will strip the threads or crack the nut. But, even if the nut cracks at a weaker point, for instance between the end of the sleeve and the bottom or base of the thread, the seal between the ferrule, pipe and the sleeve is not broken because the seal-forming part of the ferrule is wedged into the cavity of the fitting.

Another important advantage of this invention is that although the pipe is free to be rotated in the connector to adjust its position before the nut is rotated beyond starting position shown in Fig. 2, after the ferrule grips the pipe, there is not only nothing tending to rotate or twist the pipe, but the pipe is held against turning. This is true because the nut and ferrule have cooperating bearing surfaces on the flange 25 and shoulder 26 permitting the nut to turn without turning the ferrule and pipe, and further because when the ferrule grips the pipe, it is forcibly pressed against the sleeve 17 of the fitting which does not turn and which prevents the ferrule and pipe from turning.

As a result of the pipe not being rotated while the connection is being made up, the flaring is accomplished by extrusion with the accompanying flow of material longitudinally and outwardly as distinguished from spinning in which the material flows not only outwardly but circumferentially.

By thus arranging the pipe so it does not rotate and confining the flared end within the limited space between the fitting and the ferrule, thinning out weakening and fracturing the flared end of the pipe as has been a difficulty with connectors heretofore proposed when tightening the nut, is completely avoided.

Should the end of the pipe have a flaw so that upon being flared it would crack or fracture, or should there be ridges or grooves in the pipe which would not iron out in the flaring, the connection according to the present invention will be leakproof notwithstanding that no packing or washer-like material is used. This result has not been possible with connectors heretofore proposed. It is accomplished according to the present invention in the forms exemplified in Figs. 1 to 4, by wedging the flared end of the pipe and the ferrule into the constricting cavity formed by the sleeve 17 which results in forming, in addition to the seal at the flare 28 between the seat of the ferrule on one side and the flare seat 16 on the fitting on the other side, another seal between the pipe behind the flare and the ferrule, and still another seal between the ferrule and the interior wall of the sleeve 17 which prevents escape of fluids along the pipe or along or around the ferrule.

In order to hold the pipe against sidewise movement in the fitting, which is especially desirable where shock and other vibrations are transmitted by or to the pipe, the bearing surfaces on the flange 25 and shoulder 26 on the nut and ferrule respectively may be inclined so that when the nut is tightened the trailing or outer portion of the ferrule is squeezed down on the pipe to tightly grip the same, and this may occur at the same time that the leading edge is being squeezed to grip the pipe, and parts may be so proportioned that the squeezing of the ferrule against the pipe extends for substantially the full length of the ferrule thus enhancing the grip of the pipe on the pipe.

If the material of the ferrule is stiff, the squeezing of the ferrule against the pipe may be facilitated by the ferrule being provided with several longitudinal slits 34 extending from near the leading edge 30 of the ferrule to the outer edge.

The slits are preferably of such width that when the ferrule is thus squeezed against the pipe, the slits are closed, thereby preventing moisture which, upon freezing, would cause trouble, or corrosive fumes from entering between the pipe and the ferrule.

The tight engagement of the flanges 25 and 26 on the nut and ferrule respectively seals the interior of the fitting against the entrance of moisture or fumes.

The width of the slot and the diameters of the flanges 25 and 27 on the nut and ferrule respectively are such that when assembling the ferrule and nut, the outer end of the ferrule may be squeezed together sufficiently to permit the flange 27 to slip under the flange 25 and assume the position shown in Fig. 1. The flange 27 may have a tapered surface 35 to facilitate this if desired.

The wedging of the pipe and ferrule as above described into the cavity of the fitting and the gripping of the pipe by the ferrule for substantially its full length so solidly connects the fitting pipe and ferrule that shock vibrations, sufficiently intense to damage the pipe itself, do not break the seals above referred to.

If the connector of Fig. 1 is to be used with an ordinary fitting (which does not have the projecting sleeve 17, and it is convenient to flare the pipe before the connection is made to the fitting) the connector may be used with a tool such as the tool 36 shown in Fig. 5, which has a body portion 37 which may be held in a vise wrench or jig, and a working end 38 which is a duplicate of the end of the fitting 10 shown in Fig. 1. In using the tool, the nut and ferrule unit is started on the threads 19 of the tool, the pipe is inserted, and the nut tightened to flare the pipe. Then the nut is backed off and the flared pipe and nut and ferrule unit are then applied to the desired fitting and the nut tightened to clamp the flared end between the seat on the ferrule and the seat on the fitting. The flange 27 on the ferrule is engaged by the nut when the latter is unscrewed to pull the ferrule and the flared pipe from the tool or from a fitting when it is desired to disconnect the pipe.

Thus, the form of the invention above described includes, as new articles of manufacture, the complete device, fitting and nut and ferrule assembly, and also the nut and ferrule assembly per se, and the fitting per se with its ferrule constricting projecting sleeve.

The ferrule 23 may, as shown, be provided with a circumferential channel back of the wedging end into which the material for the latter may flow as the connection is being made up to reduce the amount of work required to force the ferrule into the sleeve 17.

Another advantage of the device of this invention is that should there be slight eccentricity between the bore of the ferrule, its flare-forming recess, and the axis of the flare-forming projection or the axis of the threaded portion of the sleeve 17 and the nut 21 which would prevent the making of a good flare and seal with connectors heretofore proposed, no difficulty will be encountered and a tight seal will be formed when practicing the present invention because the flaring of the pipe is accomplished solely by extrusion and expansion, and rotation of the ferrule and pipe with relation to the flare-forming projection which would prevent forming a good flare and seal does not occur.

While the present invention has been described particularly in connection with self-flaring fittings, it should be understood that the connectors illustrated, particularly that illustrated in Figs. 1 to 4, may be used with the advantages above referred to even if the pipe is flared without the aid of the connector.

For instance, the ferrule and nut shown in Fig. 6 may be slipped over the end of the pipe and then the pipe may be flared by any suitable or known tool. When the connection is made up, on the fitting shown in Figs. 1 to 4 for instance, the flared end of the pipe will be clamped over the seat on the fitting and a seal will be formed at the contacting surfaces, while a second seal will be formed between the exterior of the ferrule and the projecting sleeve on the fitting. Of course, if the fitting is to be used in this way, the bore of the ferrule will be so dimensioned that the ferrule will not grip the pipe as it advances but will merely clamp it at the end of the tightening of the nut.

Referring now to the embodiment of the invention illustrated in Figs. 7 to 10, the fitting 10a is common or standard in that it has a conical projection 16a but no overhanging flange as in the fitting shown in Fig. 1, and therefore no means for compressing the ferrule 23a as the nut 21a advances.

The ferrule 23a is constructed substantially like that in Figs. 1 to 4 with the central bore 24a slightly larger than the pipe, the shoulder 26a and the flange 27a cooperating with the flange 25a on the nut and the slit 34a and roughened surface 33a if desired.

The ferrule 23a differs from that shown in Figs. 1 to 4 however, in that there is attached to its leading end a sleeve 17a whose internal diameter is slightly less than the external diameter of the ferrule. The sleeve 17a as shown in Figs. 7 to 10, is connected to the ferrule by a thin wall 39 and has its leading end extended to engage the surface of the conical projection 16a when the nut is started on the fitting as shown in Fig. 7. If desired the sleeve 17a may be press-fitted into the ferrule as shown in Fig. 15.

In this position, the pipe 29a may be slid into the connector without obstructing resistance from the ferrule until it assumes the position shown in Fig. 8 where its leading end 28a engages the end of the cone 16a ready to have the connection made up by rotation of the nut 21a. The first movement of the nut applies pressure to the ferrule 23a causing the thin wall 39 to be sheared or broken because the sleeve 17a cannot advance, and causing the slightly larger ferrule 23a to be forced into the sleeve 17a and be squeezed together against the pipe so that the pipe is gripped and advanced with the ferrule to flare the end of the pipe over the cone as shown in Fig. 9. To guide the flaring end of the pipe and ultimately confine it, the leading end of the sleeve 17a has a counterbore or recess 40. As the flaring end of the pipe enters the recess 40 and advances along the cone, the leading end of the ferrule which has a conical recess continues to penetrate the sleeve until the position shown in Fig. 10 is reached, in which the flared end of the pipe is clamped between the end of the cone and the ends of the ferrule and sleeve substantially filling the space between them. At the same time, a flange 41 on the ferrule engages the end of the sleeve to press the sleeve tightly against the cone of the fitting. While initially the sleeve 17a is carried by the ferrule, as soon as the making-up of the connector takes place, it will be seen that the sleeve virtually becomes part of the fitting.

The functions and advantages of the connector shown in Figs. 7 to 10 are, except as noted below, the same as those of the fitting shown in Figs. 1 to 4, and need not be repeated here. Parts shown in Figs. 7 to 10 corresponding to those shown in Figs. 1 to 4 have the same numerals with the addition of the exponent "a."

In existing fittings for small sizes of pipes, the difference between the diameter of the pipe used and the diameter of the threaded end of the fitting does not afford sufficient space between the nut and the pipe to accommodate a ferule 24a and sleeve 17a of sufficient tensile strength for satisfactory performance in all cases. To meet this situation, the present invention provides, as shown in Figs. 11 and 12, a bushing 42 which may be threaded over the body 10b to become one with it and thus permit a large nut 21b which provides sufficient room for the sleeve 17b and ferrule 23b. The bushing 42 has internal threads 43 to be received by the ordinary standard smaller size fitting 10b and external threads 44 to receive the nut 21b.

In this form of the invention, the ferrule 23b and sleeve 17b are initially made integral as in the form in Figs. 7 to 10, and operate in the same manner with the exception that the sleeve 17b engages the end of the bushing 42 rather than the cone 16b whose diameter is too small to be received by the sleeve 17b. Also, the recess 45 in the leading end of the sleeve 17b is sufficiently deep for the bottom of the recess to engage the flared end of the pipe.

The bushing 42 need only be hand-screwed either on the fitting or in the nut before the fitting and nut are brought together, for the turning of the nut will set the bushing home on the fitting before the wall 39b breaks down.

The connection shown in Fig. 11, etc., operates in the same manner and has, except as noted below, the same advantages as those shown in Figs. 1 to 4, and Figs. 7 to 10, and it is not believed necessary to restate these advantages here. Parts shown in Figs. 11 and 12 and corresponding parts shown in Figs. 1 to 4 have the same numbers with the exponent "b" added.

Another form of adapter and connector to accommodate the smaller size standard fittings is shown in Figs. 13 and 14, the parts corresponding to parts illustrated in Figs. 1 to 4, having the same numbers with the exponent c added. In this form of the invention, the bushing 46 has internal threads 47 and a projecting sleeve portion 17c which performs the same functions as the projecting sleeve 17 of the form shown in Figs. 1 to 4, and likewise has external threads 19c to be engaged by the nut 21c. The bushing 46 may be tightened on the fitting 10c by a wrench applied to its outer surface which may be hexagonal, then the nut may be started on the end the sleeve, and then the operation of inserting the pipe and tightening the nut may proceed as in the use of the form of the invention shown in Figs. 1 to 4.

The three separate seals provided in the form of the invention shown in Figs. 1 to 4 are also provided in the other forms of the invention illustrated. However, due to the fact that in the forms shown in Figs. 7 to 14 the sleeve forming the cavity for the ferrule and pipe is not integral with the fitting, the seal between the ferrule and the fitting might be said to be less complete or positive than that produced in the form shown in Figs. 1 to 4. Whether this is so or not depends on the manner in which the sleeves 17a, 17b or 17c seat themselves on or embed themselves in the fitting. If the materials of the fitting and sleeve are such as to permit forming a seal between these parts, the third seal referred to above will be formed.

I have found that with the connectors of the present invention, any sort of tube, pipe or other hollow elongate member may be flared and clamped in firm engagement with a body regardless of the kind of material of which the pipe, etc., connector or body may be made, so long as the connector and ferrule have sufficient tensile strength and are sufficiently hard or rigid to operate with the materials of which the pipe is made and the pipe end is sufficiently stretchable or the material is sufficiently flowable to form a flare. For instance, I have found by test and trial that with a connector made of brass or plastic material, I can flare and clamp pipes made of rubber or rubber substitutes or materials commonly known as plastics, and ductile steel pipes including the type known as Bundy tubing, for the flaring operation performed by my connector does not depend on spinning or flowing the material circumferentially, but rather on extrusion or longitudinal and outward flow of the material.

For the same reason the use of my improvements is not limited to pipe having circular cross-sections, for I have found that pipes having square and other noncircular cross-sections may be flared and clamped provided the end of the body or fitting and the end of the ferrule are given shapes which forming dies would have for the material used in accordance with well-known forming die practice. I believe no connector heretofore proposed can accomplish this.

In making up the connection by means of the various forms of devices illustrated herein when the flared end of the pipe reaches the limit of its movement, such continuing axial movement of the ferrule as is necessary to bring the end of the ferrule firmly against the flared end of the pipe to clamp the latter, is permitted by longitudinal sliding of the ferrule over the pipe.

Variations and modifications may be made within the scope of this invention and portions of the improvements may be used without others.

I claim:

1. A pipe connector comprising a body member having a projection having a flare-forming surface, an axially extending wall surrounding said projection and with the latter providing a flare-receiving recess of determinate size to contain the flared pipe and the hereinafter mentioned ferrule, said recess extending axially beyond said flare-forming surface of the projection a determinate distance dependent upon the amount of pipe to be flared, a draft member threaded to said body member, a ferrule joined to the draft member for advancement therewith, said ferrule having a bore of greater diameter than the smallest diameter of said projection to freely pass a pipe therethrough to abut said flare-forming surface of the projection, said ferrule having an abutment portion, the outer diameter of which exceeds the diameter of the recess so that the abutment portion of the ferrule engages the wall at the outer end of the recess, whereby threading of the draft member upon said body causes the ferrule to advance into said recess to be compressed into clamping engagement with the pipe at a place thereon spaced a distance from the pipe end dependent upon said determinate distance to extrude said pipe along the flare-forming surface of the projection and substantially fill said recess to form a leak-tight joint with said pipe.

2. The invention as defined in claim 1, in which the axially extending wall comprises an integral extension on the ferrule connected to the ferrule by a frangible connection and adapted when the draft member is threaded on the body member to abut the body member and be sheared from and penetrated by the ferrule which is thereby compressed on the pipe.

3. The invention as defined in claim 1, in which the axially extending wall is in the form of a bushing having internal and external threads, the one to engage the body member and the other to engage the draft member.

4. A pipe coupling comprising a body member having a flare-forming surface adapted to engage and position the end of a pipe inserted in said body member for connection therewith, a cylindrical surface in said member forming a recess surrounding said flare-forming surface and being of a size to contain the flared pipe and the hereinafter mentioned ferrule and extending beyond the end of the flare-forming surface a determinate distance dependent upon the amount of the pipe to be flared, an inwardly and forwardly inclined camming edge formed at the outer end of the cylindrical surface, a connector comprising a draft member adapted to be connected to said body member for advance relative thereto and a ferrule having a driving connection with said draft member, said ferrule having a bore adapted to permit a pipe to be freely passed therethrough and into abutment with said flare-forming surface, the outer diameter of the ferrule exceeding the diameter of the recess, so that when the draft member is connected to the body member with the ferrule abutting said camming surface and advancement of the ferrule is resisted thereby and a pipe is inserted through the ferrule into abutment with said flare-forming surface, the pipe will be automatically positioned beyond the inner end of the ferrule a distance sufficient to automatically provide the requisite length of pipe beyond said ferrule to form the correct length of flare thereon, whereby when said draft member is further advanced along the body member, said ferrule being in abutting relation with the draft member is advanced thereby against said camming edge and compressed to grip the pipe and extrude said measured length of pipe along said flare-forming surface.

5. A tube connector, including in combination: a first body member, a second body member provided with threads for engagement with threads of the first body member to draw said members together, said first body member being formed with a longitudinal passage and with an inclined flare-gripping seat surrounding the said passage and forming a tube-positioning stop, said first body member also being provided with a stop-abutment facing toward and positioned for engagement by the abutment surface of the hereinafter mentioned tube-gripping ferrule; the second body member being formed with a tube-receiving passage and with an inclined deflecting surface around the said passage and inclined in the same general direction as the flare-gripping seat of the said first body member; and a tube-gripping ferrule adapted to fit upon the end portion of a tube and having a flare-gripping seat adapted to cooperate with the flare-gripping seat in the first body member, the said tube-gripping ferrule also having inwardly bendable gripping means positioned to engage with the inclined deflecting surface of the said second body member to be forced inwardly thereby into gripping engagement with the periphery of a tube a predetermined distance from the end of a tube lying against the tube positioning stop, the said tube-gripping ferrule also having upon its exterior an abutment surface the material of which is normally rigid therewith but displaceable to permit the ferrule to advance past the stop-abutment on the first body, the said abutment surface on the ferrule being located for engagement with the stop abutment of the said first body member prior to the cooperation of the flare-gripping seat of the said ferrule with the flare-gripping seat of the said first body member; the relative resistances to displacement of the gripping means and the abutment of the said tube-gripping ferrule being such that the said gripping means will be deflected into gripping engagement with a tube before the material of said abutment is displaced.

JAMES C. RICHARDSON.

REFERENCES CITED

The following references are of record in the file of this patent:

UNITED STATES PATENTS

| Number | Name | Date |
|---|---|---|
| 1,790,025 | Schnaier | Jan. 27, 1931 |
| 2,112,239 | Guarnaschelli | Mar. 29, 1938 |
| 2,128,459 | Guarnaschelli | Aug. 30, 1938 |
| 2,290,890 | Parker | July 28, 1942 |
| 2,466,057 | Somma | Apr. 5, 1949 |

FOREIGN PATENTS

| Number | Country | Date |
|---|---|---|
| 394,413 | Great Britain | June 29, 1933 |